US011313358B2

(12) United States Patent
Promutico et al.

(10) Patent No.: US 11,313,358 B2
(45) Date of Patent: Apr. 26, 2022

(54) ACTUATOR WITH SHAPE MEMORY WIRE (71) Applicant: BITRON S.P.A., Turin (IT)

(72) Inventors: Fabrizio Promutico, Turin (IT); Elio Sellari, Turin (IT)

(73) Assignee: BITRON S.P.A., Turin (IT)

( * ) Notice: Subject to any disclaimer, the term of this patent is extended or adjusted under 35 U.S.C. 154(b) by 431 days.

(21) Appl. No.: 16/607,854

(22) PCT Filed: May 8, 2018

(86) PCT No.: PCT/IT2018/050081
§ 371 (c)(1),
(2) Date: Oct. 24, 2019

(87) PCT Pub. No.: WO2018/207222
PCT Pub. Date: Nov. 15, 2018

(65) Prior Publication Data
US 2020/0191128 A1 Jun. 18, 2020

(30) Foreign Application Priority Data

May 10, 2017 (IT) .......... 102017000050295

(51) Int. Cl.
F03G 7/06 (2006.01)
B21F 15/10 (2006.01)
H01H 61/01 (2006.01)
H01R 4/01 (2006.01)
H01R 43/048 (2006.01)

(52) U.S. Cl.
CPC .............. F03G 7/065 (2013.01); B21F 15/10 (2013.01); H01H 61/0107 (2013.01); H01R 4/01 (2013.01); H01R 43/048 (2013.01)

(58) Field of Classification Search
CPC ...... F03G 7/065; H01H 61/0107; H01R 4/01; H01R 43/048
USPC ...................................................... 60/526–528
See application file for complete search history.

(56) References Cited

U.S. PATENT DOCUMENTS 5,684,448 A    11/1997  Jacobsen et al.
5,771,742 A *  6/1998  Bokaie .............. E05B 47/0009
                                                      337/140
6,494,225 B1   12/2002  Olewicz et al.
(Continued)

FOREIGN PATENT DOCUMENTS

DE    102004036829 A1    3/2006
DE    102009005234 A1   12/2009

OTHER PUBLICATIONS

Italian Search Report dated Nov. 15, 2017 for the corresponding Italian Patent Application.

Primary Examiner — Shafiq Mian
(74) Attorney, Agent, or Firm — Platinum Intellectual Property LLP (57) ABSTRACT The present invention concerns an electric actuator (A, A'), comprising a rotor member (6) and an actuating assembly (4) configured to interfere with said rotor member (6), causing it to rotate, characterized in that said rotor member (6) comprises a pair of eccentric reliefs (63) arranged so as to interfere with said actuating assembly (4), and in that said actuating assembly (4) comprises a shape memory wire (2), wherein said actuating assembly (4) is configured to cause the rotation of said rotor member (6) when electric current flows through at least a portion of said shape memory wire (2).

10 Claims, 10 Drawing Sheets (56) References Cited

U.S. PATENT DOCUMENTS

| | | | |
|---|---|---|---|
| 6,513,835 B2 * | 2/2003 | Thomas | B60R 21/216 |
| | | | 280/736 |
| 8,051,656 B1 | 11/2011 | Cripe et al. | |
| 2012/0261025 A1 | 10/2012 | Bogursky et al. | |
| 2015/0300519 A1 * | 10/2015 | Da Pont | F16K 31/10 |
| | | | 137/554 |

* cited by examiner

ACTUATOR WITH SHAPE MEMORY WIRE

RELATED APPLICATIONS

This application is a United States National Stage Application filed under 35 U.S.C 371 of PCT Patent Application Serial No. PCT/IT2018/050081, filed May 8, 2018, which claims Italian Patent Application Serial No. 102017000050295, filed May 10, 2017, the disclosure of all of which are hereby incorporated by reference in their entirety.

The present invention relates to an improved actuator with shape memory wire.

More specifically, the invention relates to a general purples shape memory type actuator, designed and manufactured in particular for reducing the assembly steps and to have a particularly reduced size.

In the following the description will be directed to the realization of an actuator for household appliances and machines in general, but it is apparent that the same should not be considered limited to this specific use.

As is well known, actuators currently using shape memory wires are common in the market.

The shape memory wires have the known property of "keeping memory" of their shape, recovering it when they are subjected to heating.

Therefore, shape memory wires recover an original shape when they are crossed by current and, by Joule effect, heat up, or when heated directly by a thermal source.

In the manufacture of actuators, it is known the common difficulty of having a connection between the aforementioned shape memory wires with electrical terminals. Generally, this manufacture step is carried out by means of crimping, which consists in physically, and therefore electrically, connecting the electrode and the shape memory wire by means of a suitable tool. This operation takes place substantially mechanically by "pressing" the wire on the electrode, using an additional element to stop the two elements, so as to achieve a good electrical contact.

However, this solution results in high costs in terms of manufacturing.

Moreover, this process does not always guarantee an optimal coupling over time, also due to the aforementioned mechanical properties of said wires.

In addition to the above, actuators with shape memory wire are usually also particularly complex from a structural standpoint. This implies that, despite the constructive and operating advantages, they present different problems for the industrialization thereof.

It is apparent that the above limits of the shape memory wire actuators according to the prior art are burdensome in economic and industrial terms.

In light of the above, it is therefore an object of the present invention to propose a shape memory wire actuator that overcomes the technical problems of the prior art.

Another object of the invention is to propose an actuator wherein the terminals are fixed to each other by an advantageous coupling method.

It is also an object of the present invention to propose an actuator of said type that has a high reliability and technical performances, which can be easily reproduced from an industrial point of view.

Another object of the present invention is to propose a shape memory actuator with very compact dimensions, to make it easy to install even in small household appliances.

It is therefore specific object of the present invention an electric actuator, comprising a rotor member and an actuating assembly configured to interfere with said rotor member, causing it to rotate, characterized in that said rotor member comprises a pair of eccentric reliefs arranged so as to interfere with said actuating assembly, and in that said actuating assembly comprises a shape memory wire, wherein said actuating assembly is configured to cause the rotation of said rotor member when electric current flows through at least a portion of said shape memory wire.

Always according to the invention, said actuating assembly may be configured to alternately rotate said rotor member in opposite directions.

Still according to the invention, said rotor member may be engageable to a member to be moved, such as a driven shaft and the like, such that, when said rotor member is rotated, the rotary motion is transferred to said member to be moved.

Advantageously according to the invention, said actuator may comprise a switch and said actuating assembly may be configured to interfere with said switch.

Advantageously according to the invention, said actuator may comprise a first electrode, a second electrode, a third electrode and a movable electrode, wherein said second electrode and said movable electrode form said switch, wherein one end of said shape memory wire may be coupled to said first electrode and the other end to said third electrode, and wherein said shape memory wire may be arranged so as to present an electrical coupling with said second electrode.

Further according to the invention, said actuating assembly may comprise a first and a second actuating member capable of interfering with a respective eccentric element of said rotor member in a single direction.

Always according to the invention, said actuating assembly may comprise a first and a second pulley, around which said shape memory wire passes, and said first and second actuating members may comprise a first and a second arm, each rotatable and comprising a respective base portion, shaped in such a way as to interfere with a respective eccentric element of said rotor member, and an end portion, wherein each one of said first and second arms takes a rest position and an operative position, wherein the respective end portion interferes with said movable electrode, to open said switch, and the respective base portion interferes with the respective eccentric element, causing the partial rotation of said rotor member, and wherein, when the shape memory wire portion arranged around one of said first and second pulley is power supplied so that a current flows through it overheating, said portion of shape memory wire retracts and said first or second pulley rotates, so as to cause the rotation of the respective first or second arm, bringing it from said rest position to said operating position and causing the rotation of said rotor member interfering with an eccentric element, the other eccentric element of said rotor member is thus arranged in a position such as to allow the rotation of said rotor member only when the other arm is rotated.

Still according to the invention, each of said first and second arms may also comprise a respective electric terminal and said actuator may comprise two return springs, each electrically coupled with a respective electrical clamp, arranged to bring the respective first and second arms from said operating position to said rest position.

Advantageously according to the invention, said shape memory wire may have the ends coupled to said electrical terminals and one of said return springs may be interposed between said third electrode and the electrical clamp of said first arm and the other return spring is interposed between said first electrode and the electrical clamp of said second arm.

Further according to the invention, said movable electrode may comprise a protrusion and said rotor member may comprise a pair of cavities, arranged so that when the rotor member rotates, one of said cavities removably engages with said protrusion of said movable electrode (14), so as to keep in position said rotor member.

Preferably according to the invention, said movable electrode may comprise a lower lamina and a support coupled with said lower lamina having said protrusion, and said rotor member may comprise a projection, on which said cavities are formed.

Always according to the invention, said first and second actuating members may respectively comprise a first and a second slider, each capable of engaging with a respective eccentric relief, wherein said first and second slider may be capable of assuming a rest position and an operative position, in which it interferes with said movable electrode, to open said switch, wherein, when the shape memory wire portion arranged around one of said first or second sliders is power supplied in such a way that a current flows through it overheating, said portion of shape memory wire retracts and said first or second slider is moved passing from said rest position to said operating position and causing the rotation of said rotor member, interfering with the respective eccentric element, the other eccentric element of said rotor member is thus arranged in a position such as to allow the rotation of said rotor member only when the other slider is moved.

Still according to the invention, each of said first and second sliders may comprise a respective return spring, arranged so as to hold said slider in said rest position.

Advantageously according to the invention, said movable electrode may comprise a relief and said rotor member may comprises a pair of notches, arranged in such a way that, when the rotor member rotates, one of said notches removably engages with said relief of said movable electrode, so as to hold in position said rotor member.

Further according to the invention, said movable electrode may comprise a lower plate on which said relief is obtained, and said rotor member may comprise a projection, on which said notches are obtained.

Preferably according to the invention, each of said sliders may have a guide along the respective side edge, and said shape memory wire may pass on both guides of said first and second sliders, so that when it is heated it moves alternately said sliders from said rest position to said operating position.

The present invention will be now described, for illustrative but not limitative purposes, according to its preferred embodiments, with particular reference to the figures of the enclosed drawings, wherein.

In the various figures, similar parts will be indicated by the same reference numbers.

Referring to FIGS. 1-5, an actuator A is observed, comprising a containment enclosure 3 for containing a mechanism of various elements described below, a shape memory wire 2, a switch SW and a group of electrodes 11, 12, 13, 14, a rotor member 6 and a drive assembly 4, better described below.

Figure 1:
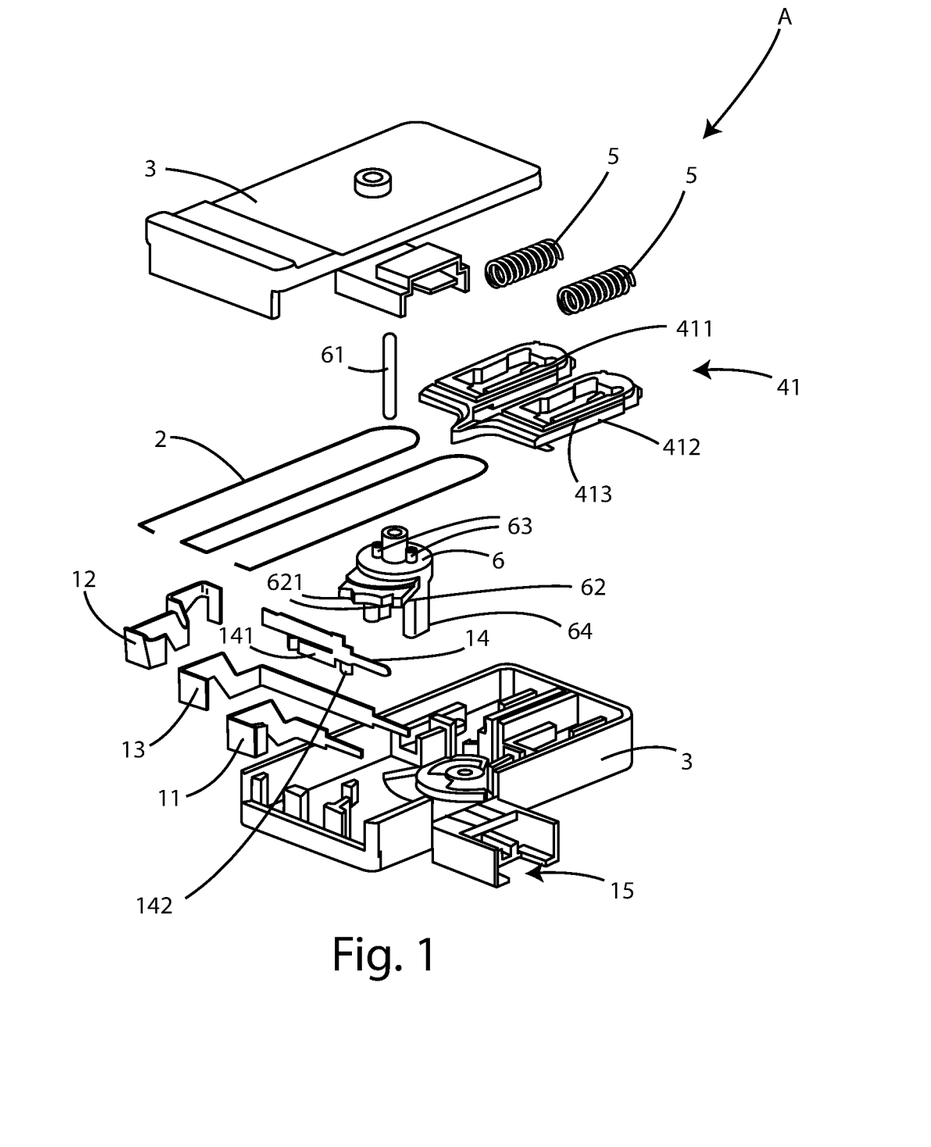
FIG. 1 shows an exploded view of a first embodiment of an actuator according to the present invention.

The containment enclosure 3 has an opening 31 having the shape of a circle arc, the operation thereof will be better explained below.

The actuating assembly 41 in the first embodiment comprises actuating members and in particular a pair of sliders 411 and 412, capable of moving between a rest position and an operating position, each one having a guide 413 along the side edge.

Furthermore, each slider 411 and 412 has a recess, respectively indicated by the numeral reference 411' and 412".

For each slider 411 and 412 a respective return spring 5 is provided, of linear type, each one inserted in said recesses 411' and 412" and abutting between the containment enclosure 3 and a respective slider 411 and 412.

Said actuator A further comprises three electrodes 11, 12 and 13, and a further movable electrode 14, connected to a terminal board 15, for connecting the actuator A to the control logic of the machine, to which it is connected. The movable electrode 14 and the electrode 12 form the switch SW, the operation of which will be better defined below.

The movable electrode 14 also comprises a lower lamina 141 having a relief 142, the operation of which will be better explained below.

The shape memory wire 2 is connected and fixed by a clinching method, at a first end to said electrode 12, at an intermediate point to said electrode 13 and at the second end to said electrode 11.

The shape memory wire 2 passes on both said guides 413 of said sliders 411 and 412, so that when current flows between the wire portions between said first 11 and second 12 electrode or between said second 12 and said third 13 electrode may appropriately and respectively move said sliders 411 and 412, as it will be better explained below.

The rotor member 6 comprises a projection 62, having two block notches 621, as it will be better explained below.

Figure 5:
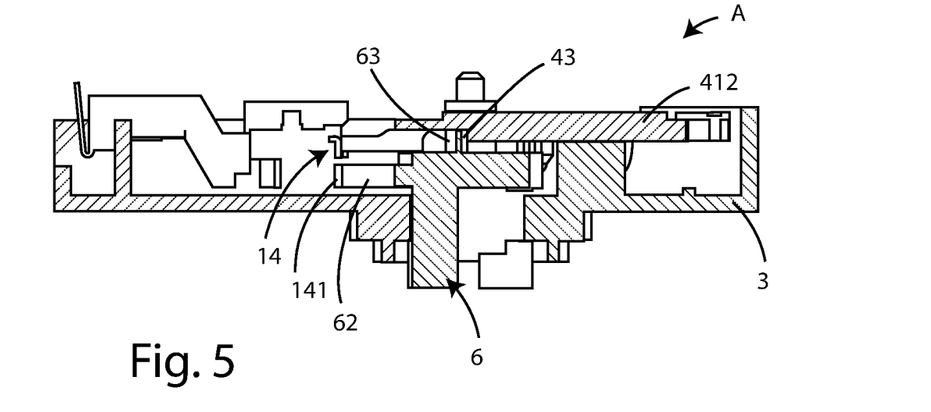
FIG. 5 shows a view along the section line A-A of the actuator according to FIG. 1.
Figure 5A:
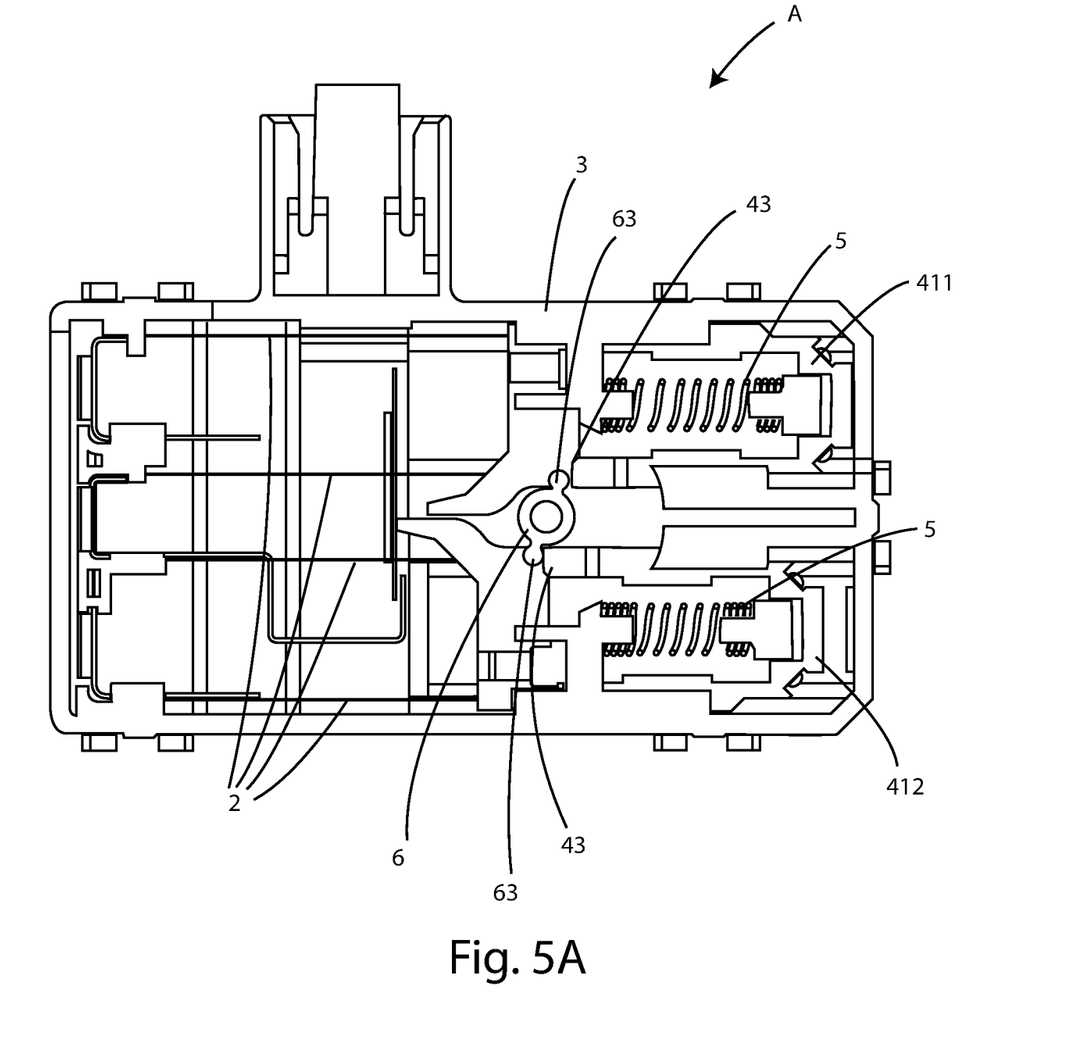
FIG. 5A shows an open bottom view of the actuator according to FIG. 1.

Said rotor member 6 also comprises on the surface a pair of eccentric reliefs 63, by means of which it interacts respectively with said sliders 411 and 412 by means of the strikers 43 (see FIG. 5), placed under the sliders 411 and 412, so as to engage at least in some situations with the eccentric reliefs 63 (see also FIG. 5A).

Moreover said rotor member 6 is pivoted about said containment enclosure 3 by means of a respective pin 61 and it is arranged between the two sliders 411 and 412, to which it is coupled by said reliefs 63, such that when one of said sliders 411 or 412 is activated, since it is engaged to said actuator member, causes it to rotate by a predefined angle in a direction opposite to that of the other slider.

Said rotor member 6 also comprises two wings 64 which can be coupled with or connected to a driven shaft (not shown in the figures), to operate it. In this way, when the rotor member 6 is rotated by said sliders 411 or 412, said driven shaft is rotated in its turn.

Figure 2:
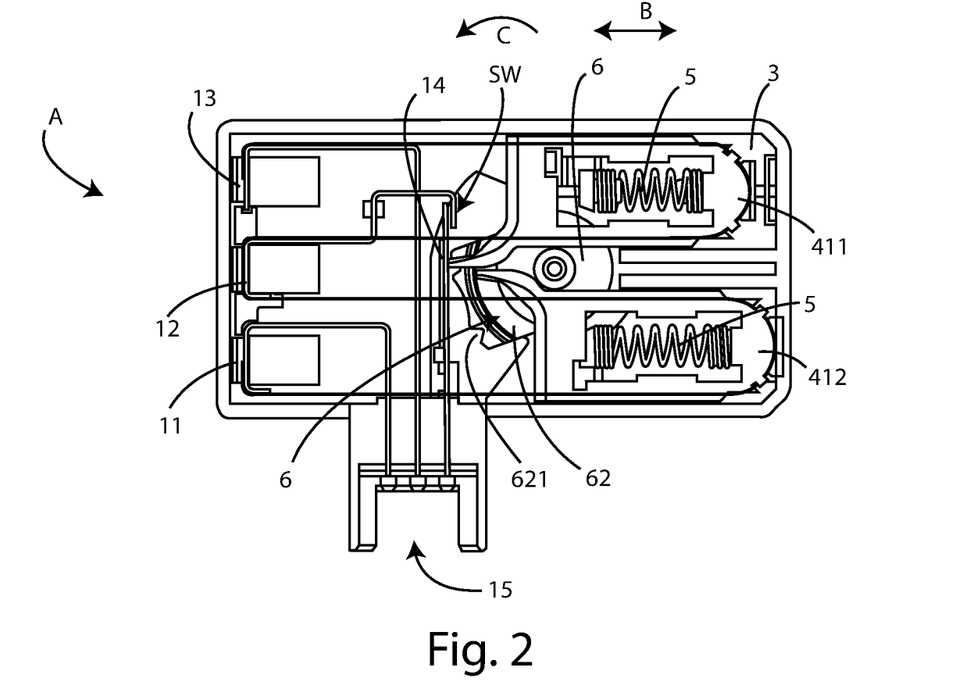
FIG. 2 shows a top view of the actuator of FIG. 1 as assembled, without the cover 3 and in a first operating state.
Figure 3:
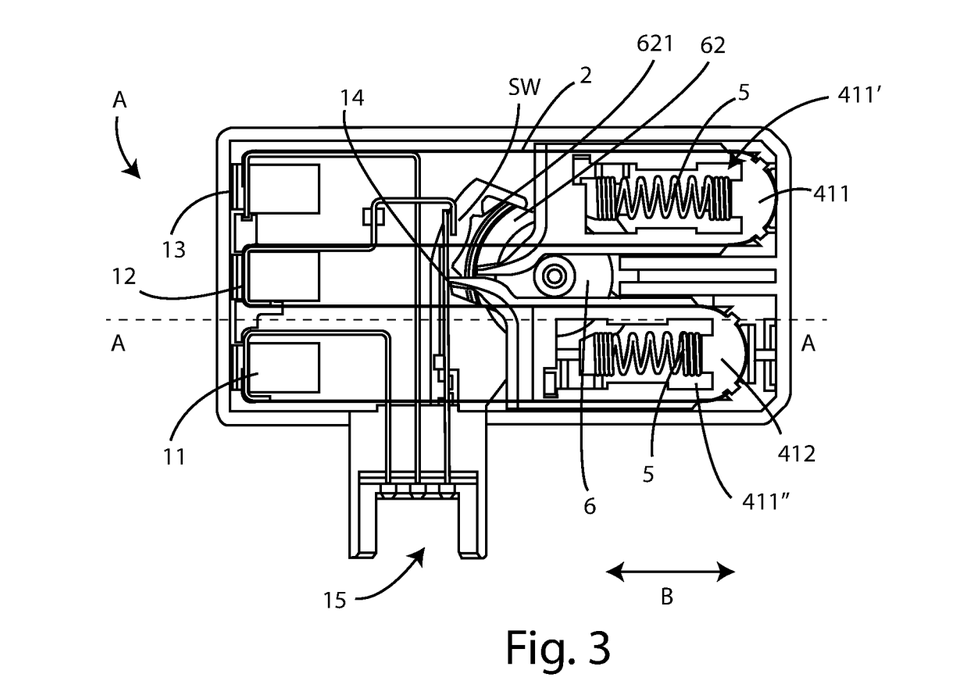
FIG. 3 shows a top view of the actuator according to FIG. 1 as assembled, without cover 3 and in a second operating state.

Moreover, said rotor member 6 is arranged to interact with said switch SW, to open it only when said sliders 411 and 412 arrive alternately at the end of stroke, as shown in FIG. 2 or 3.

Figure 4:
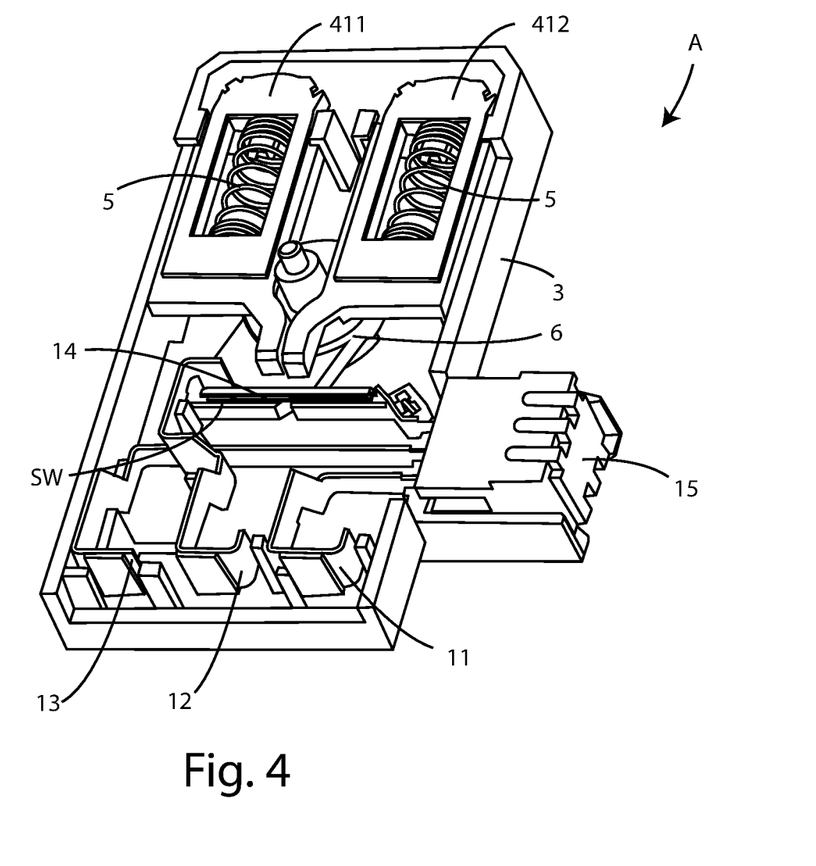
FIG. 4 shows a perspective view from above of the actuator according to FIG. 1 in a non-operating state.

The rotor member 6 is arranged to lock or to be held at the end of the rotation caused by each slider 411 or 412, by engaging the notches 621 of the projection 62 with the relief or protrusion 142 of the lower lamina 141 of the movable electrode 14, when, alternatively, one of the two sliders 411 and 412, after reaching the end of stroke, retracts towards the non-operating position (non-operating state of the actuator indicated in FIG. 4).

The operation of the actuator A described above is as follows.

When the actuator A is in the inactive or non-operating position (as in FIG. 4), the switch SW is closed, i.e. the movable electrode 14 is in contact with the electrode 12 and there is no power supply for the shape memory wire 2, which is therefore at room temperature.

Figure 6:
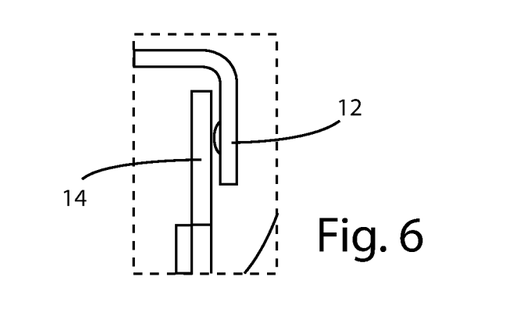
FIG. 6 shows a detail of the actuator according to the invention, wherein the switch is open.

When a suitable electric current is provided through the terminal board 15, for example between the electrodes 12 and 13, following a warming up time period, the first portion of the shape memory wire 2, the one connecting said electrodes 12 and 13, heats up due to the effect of the current flowing through and retracting, causing the movement in the direction of the arrow B of the first slider 411, which, overcoming the force opposed by the return spring 5, passes from the rest position to the operative position (see FIG. 2), wherein at the end of its stroke it opens, with one end, said switch SW (see FIG. 6) and rotates during its stroke, and in the direction of the arrow C, said rotor member 6 of a preset angle, which, in the present embodiment is about 20°, by means of one of the eccentric reliefs 63 (the one which engages the slider 411), which pushes axially said slider 411 with respect to the wire 2.

Once the switch SW has been opened (see FIG. 6), such that said movable electrode 14 is displaced from said electrode 12, from one end of the slider 411, which has reached the end of stroke (this moment of end of stroke is indicated in FIG. 2).

Figure 7:
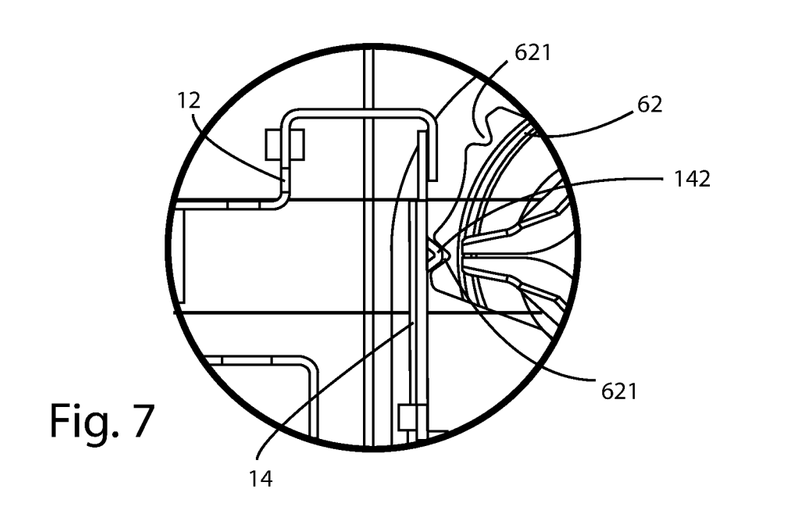
FIG. 7 shows a detail of the actuator according to the invention, wherein a projection with block notches is engaged with a part of an electrode.
Figure 8:
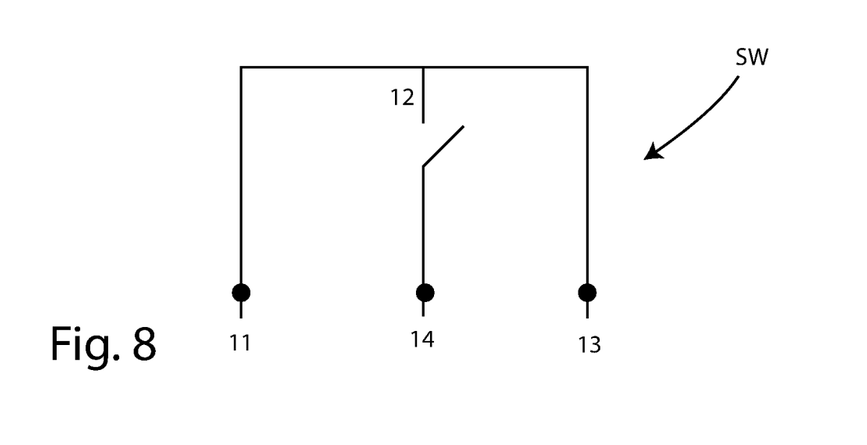
FIG. 8 shows the electrical circuit of the switch of the actuator according to the present invention.

When the power supply between the electrodes 12 and 13 is interrupted, for example by the control logic of the machine following the sudden interruption of the voltage due to the separation of the contacts 12 and 14 (see FIG. 6), the first portion of the memory shape wire 2 starts cooling and retracts, causing the closing of the switch SW (i.e. the movable electrode 14 returns to contact with the electrode 12), the relief 142 of said moving electrode 14 remains engaged with one of the two notches 621 of said projection 62 (see FIG. 7).

For this reason, while the slider 411 retracts to the rest position and for all the time in which the actuator A remains in this state, the rotor member 6 remains in the reached position. In this way, at the end of the cooling phase, the slider 411, being not yet stressed by the now-cooled shape memory wire 2, returns to the rest position, due to the respective return spring 5.

In order to have a second rotation of the rotor member 6, at the end of the activation, an electric current is made to flow (for example from the central control unit of the machine on which the actuator A is installed) between said electrode 11 and said electrode 12, so that the second portion of the shape memory wire 2 is heated, moving the second slider 412, which, by overcoming the return force of the respective return spring 5, forces the rotor 6 to rotate by an equal and opposite angle to that of the first activation (see FIG. 3), i.e. of 20° and, with one end at the end of stroke opens again said switch SW. The opening signal of the switch SW is detected by the central control unit of the machine wherein the actuator A is installed by the terminal board 15, for electrically disconnecting the contacts 11 and 12.

Following the interruption of the power supply of the circuit, the portion of wire 2 which embraces the slider 412 starts cooling and causes the slider 412 to retract due to the spring 5. Also, in this case, at the same time, the switch SW closes and the other notch 621, with respect to the first activation of the projection 62 of the rotor member 6, definitively engages with the relief 142 of the lower lamina 141 of the movable electrode 14 (see FIG. 7).

Thus, the actuator A creates a bistable function. In fact, two sequential signals are required, namely, one after the other, alternative, that is between two different pairs of electrodes, for allowing the generation of two signals, which in the case at issue are due to the opening of the switch SW.

The bistable activation takes place so that the switch SW remains normally closed, by opening alternately the ends of the two sliders 411 and 412 only at the moment wherein the sliders reach the end of stroke (maximum allowed shortening of the two wire portions 2 embracing each slider).

As it can be seen, the actuator A rotates the rotor member 6 in a timed and entirely mechanical manner.

It is considered that in order to carry out a further activation of the memory shape wire 2 or of its portions, it is necessary to wait a few seconds for cooling thereof to allow it to return to the rest position by bringing the temperature of the wires to room temperature.

Said sliders 411 and 412 can be made of metal, to allow a faster cooling of the shape memory wire 2.

As it can be seen, the shape memory wire 2 is clinched on the electrodes 11, 12 and 13, and in three points, to allow optimum operation of the system over time, although a circuit such as the one above implies a continuous mechanical and electric stress on the shape memory wire 2.

Figure 9:
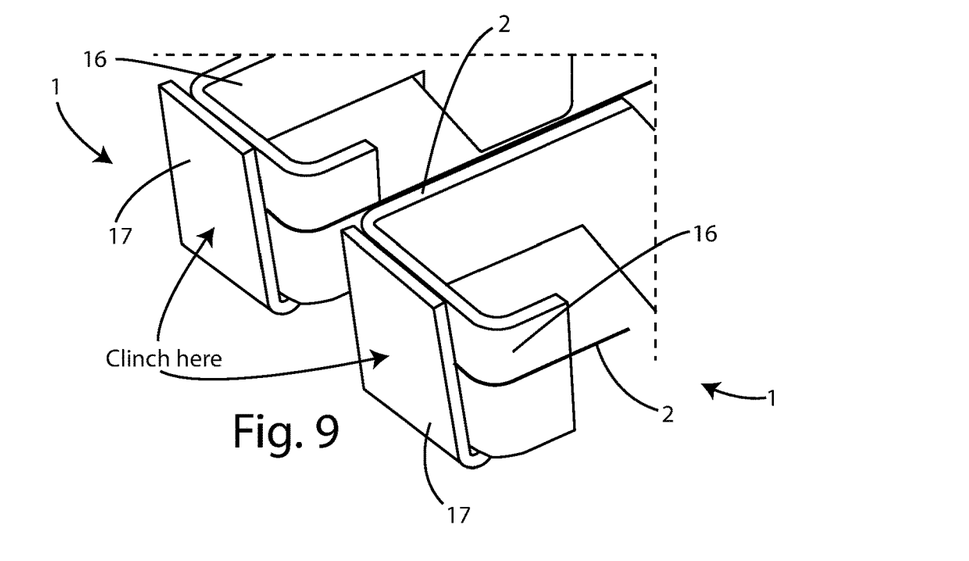
FIG. 9 shows two electrodes, each coupled with a shape memory wire by crimping.
Figure 10:
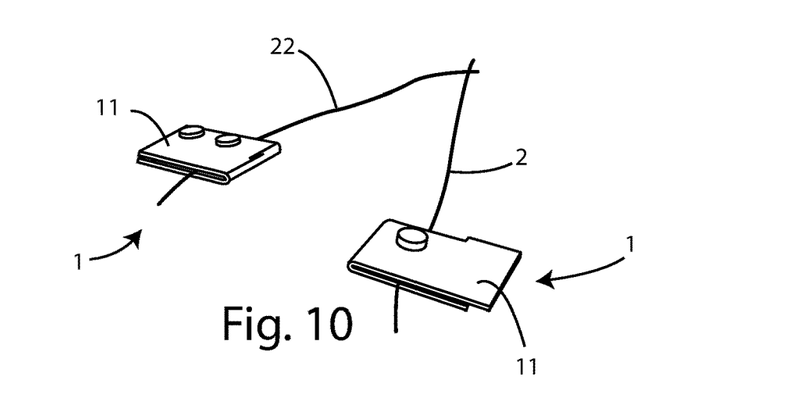
FIG. 10 shows a further view of the two electrodes according to FIG. 9.
Figure 11:
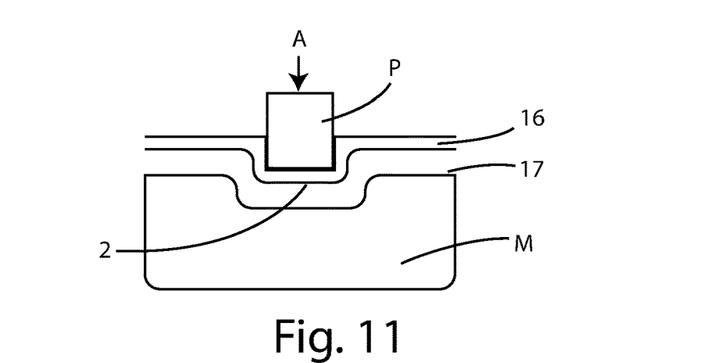
FIG. 11 shows a detail of the coupling of the electrodes with the shape memory wire according to FIG. 9.

With reference to FIGS. 9-11, it is possible to observe the coupling by clinching of two electrodes 11 and with a respective shape memory wire 2.

In particular, the electrode 11, for example, comprises a first 16 and a second 17 plate arranged overlapped, between which the shape memory wire 2 is fixed. The coupling between said first 16 and second 17 plate and said shape memory wire 2 is achieved by clinching.

In particular, after said shape memory wire 2 is placed between said first 16 and said second 17 plate, a die or mold M is applied, having an annular groove at the bottom, which is arranged on said second plate 17 and in correspondence of said shape memory wire 2.

Then, a punch P is applied to said first plate 16. The punch P is pressed in the direction of the die or mold M, thus deforming the surface of said plate 16 and of said plate 17, fitting them together in the die or mold M and in particular with the internal groove of said die or mold M. This allows not only to retain the wire between said first 16 and second 17 plate, but also to achieve an extremely strong and robust mechanical coupling, in addition to an electrical coupling.

With reference to FIGS. 12-19, a second embodiment of an actuator A' according to the present invention is observed.

Figure 12:
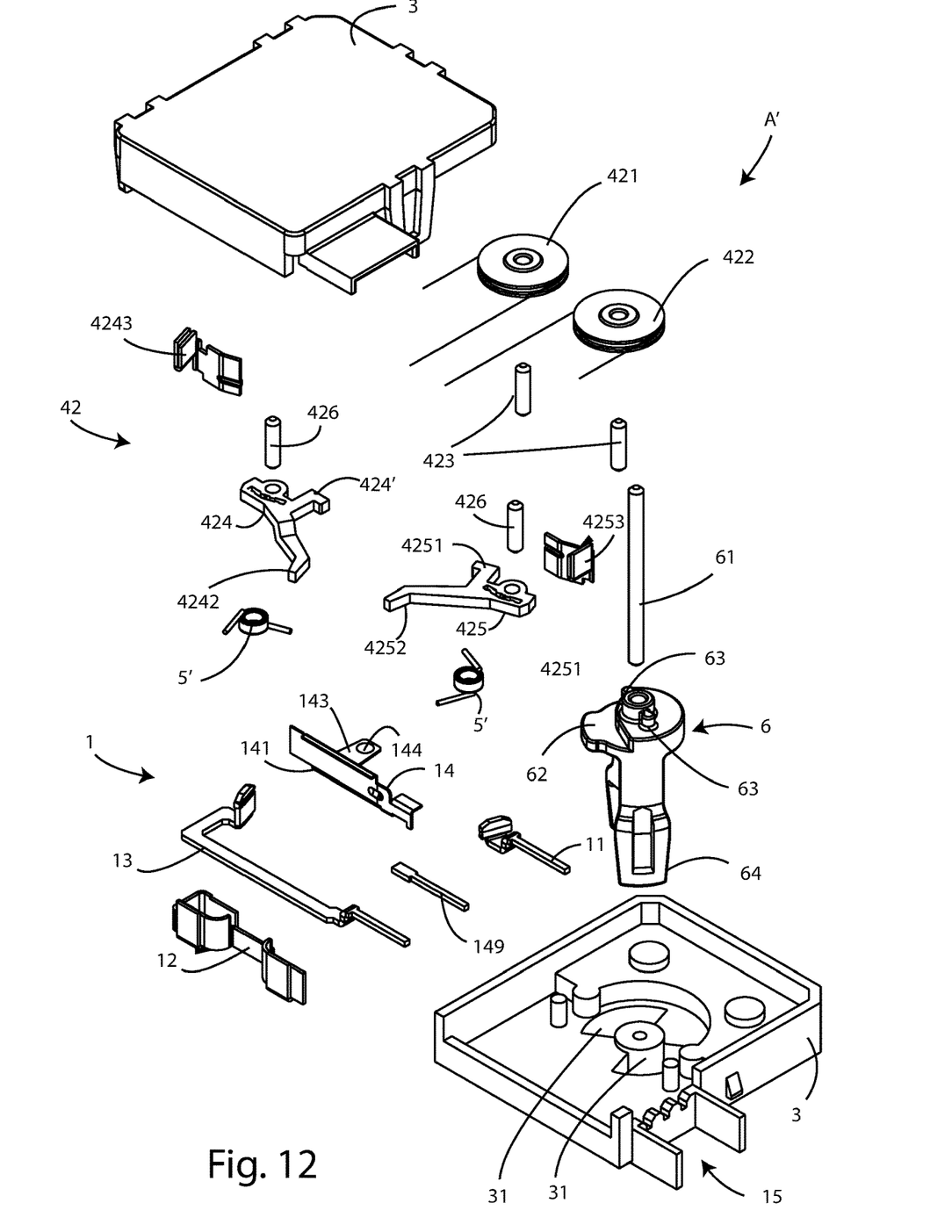
FIG. 12 shows an exploded view of a second embodiment of an actuator according to the present invention.

The movable electrode 14 and the electrode 12 also form a switch SW, also in the present embodiment. Moreover, said movable electrode 14 comprises a support 143 coupled to the lower lamina 141, having a protrusion 144, whose operation will be better described in the following.

Furthermore, said movable electrode 14 does not directly reach the terminal board 15, but in the present embodiment there is a blade 14a electrically welded to the movable electrode 14, which causes the movable electrode 14 to arrive at the terminal board 15.

In particular, also in this case, the containment enclosure 3 has openings 31, which allow the two wings 64 to come out for driving a shaft on which the actuator is installed.

The actuating assembly 42 of the actuator A' comprises a first 421 and a second 422 pulley, pivoted about respective pins 423 to said containment enclosure 3. The shape memory wire passes around said pulleys 421 and 422.

Also in this case the two pulleys 421 and 422 can be made of metal, to allow a faster cooling of the shape memory wire 2 when it is heated.

Said actuating assembly 42 comprises actuating members and in particular a first 424 and a second 425 arm, each pivoted with a respective pin 426 to said containment enclosure 3.

Each one of said first 424 and second 425 arms comprises a base portion, respectively 4241 and 4251, shaped in such a way as to interfere with said eccentric elements 63 of said rotor member 6 in the terms better defined below, and an end portion 4242 and 4252, which for space optimization reasons, are at least partially overlapping, crossing each other.

Each of said first 424 and second 425 arms also includes a respective electric terminal 4243 and 4253.

The actuating assembly 42 also includes two circular return springs 5', each arranged between a respective electrical clamp 4243 or 4253 and the electrodes 13 and 11 respectively.

Said return springs 5' are made of conductive material to ensure the electrical connection between each of the electrodes 13 and 11, the respective return spring 5', and the respective electric terminal 4243 and 4253 and, therefore, the shape memory wire 2.

The rotor member 6 is pivoted about said containment enclosure 3 by means of a respective pin 61 and has a projection 62, a pair of eccentric reliefs 63, whose operation will be better explained below, and two wings 64, which transfer the motion to the element driven on the household appliance, which the actuator operates (not shown in the figures).

Said rotor member 6 is able to rotate so as to assume a first and a second operating position.

Moreover, the projection 62 has, beneath, a pair of cavities 622, arranged in such a way that, when the rotor member 6 rotates and assumes one of said two operating positions, said cavity 622 removably engages with said protrusion 144 of said movable electrode 14, so that said rotor member 6 remains in position.

The shape memory wire 2 has an end fixed on an electric clamp 4243 integral with said first arm 424, passes on the first pulley 421, until it reaches the electrode 12 (FIG. 13), to which it is fixed by clinching or other equivalent system known in the art for such wires 2.

Figure 13:
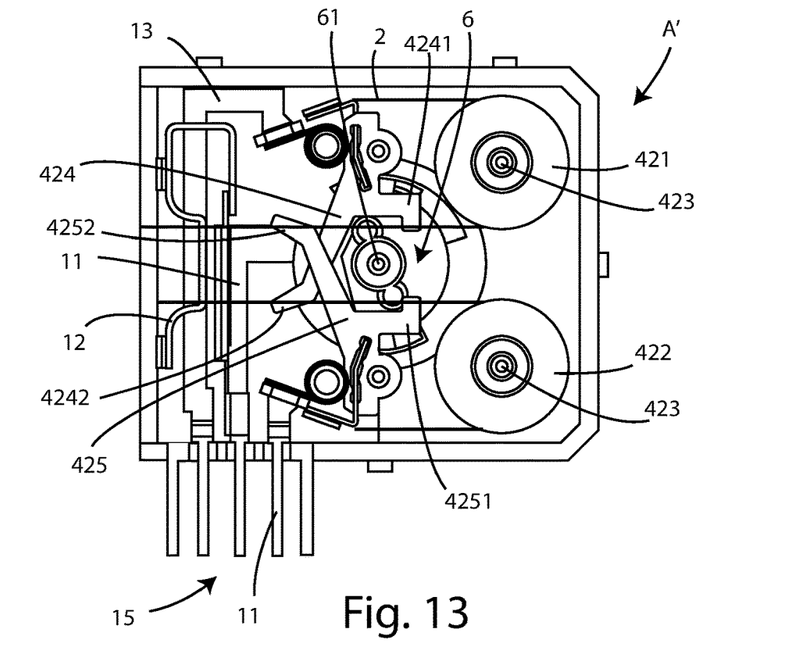
FIG. 13 shows an open plan view of the actuator according to FIG. 12.
Figure 14:
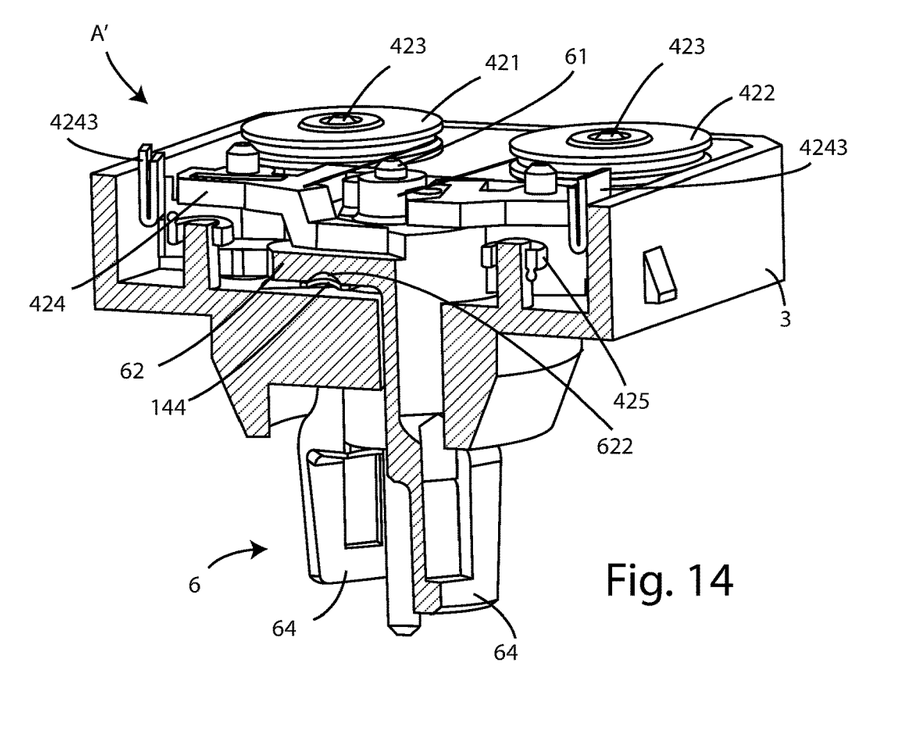
FIG. 14 shows a first cross section of the actuator according to FIG. 12.

Then, said shape memory wire passes on the second pulley 422, until it reaches the electrical clamp 4253 integral with said second arm 425.

The operation of the second embodiment of the actuator A' is, from the functional standpoint, substantially similar to that of the first embodiment.

In particular, when the actuator A' is in the rest position (FIG. 13), the switch SW is closed and there is no power supply to the shape memory wire 2, which is therefore at room temperature.

When the plant or machine, wherein the actuator A' is installed, is activated, a suitable electric current is supplied through the terminal board 15 between the electrodes 12 and 13.

During an appropriate heating time interval, the first portion of the shape memory wire 2, which connects said electrodes 12 and 13, is heated by the effect of the current flowing through the return spring 5', which, as said, is made of conductive material, and the respective electric terminal 4243, so as to retract, causing the rotation of the first pulley 421, which, by overcoming the opposite force of the respective return spring 5', causes a clockwise rotation of the arm 424 (looking at the FIG. 15), which passes from a rest position to an operative position, wherein it interferes with a respective end portion 4242 with the movable electrode 14 (see FIG. 17), opening said switch SW.

Figure 16:
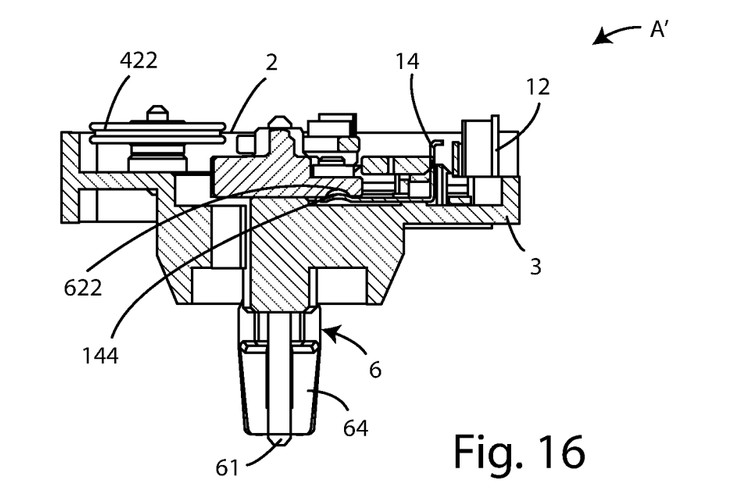
FIG. 16 shows the second cross section of the actuator according to FIG. 12.
Figure 17:
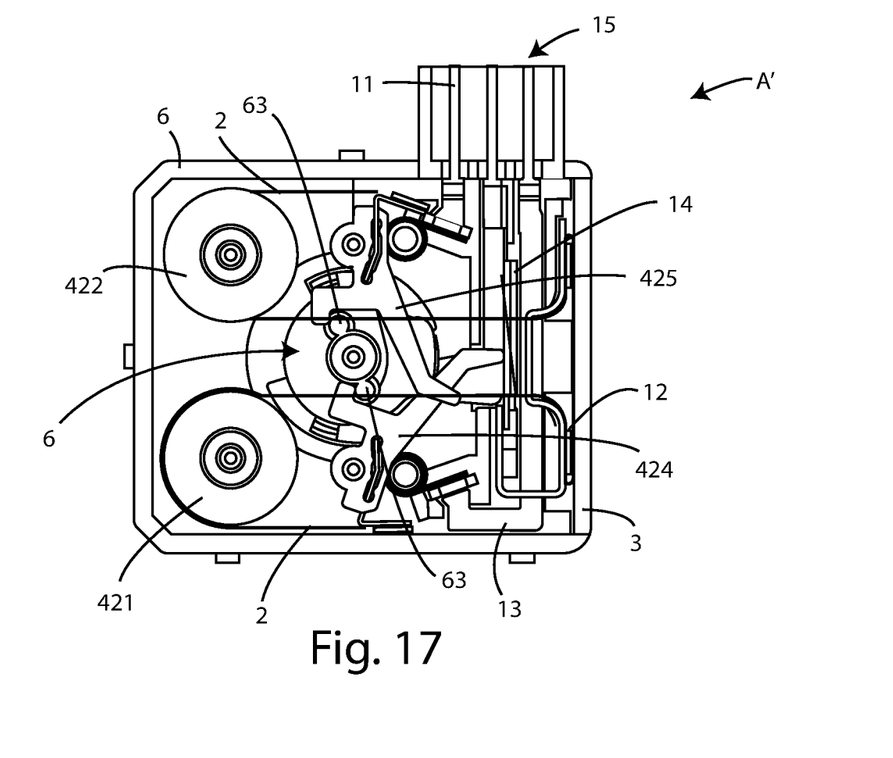
FIG. 17 shows an open plan view of the actuator according to FIG. 12 in an activation state.
Figure 18:
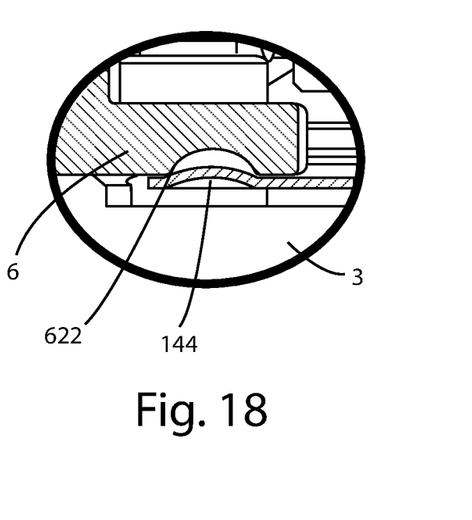
FIG. 18 shows a first detail of FIG. 16.
Figure 19:
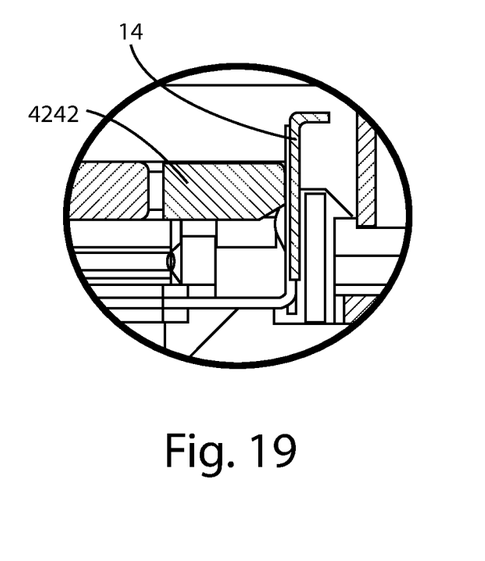
FIG. 19 shows a second detail of FIG. 16.

Simultaneously, the rotation of said arm 424 interferes with one of the eccentric reliefs 63 of the rotor member 6, causing the latter to rotate by a preset angle until one of the cavities 622 overlaps the protrusion 144, keeping the rotor member 6 in the reached position, as it can be seen in FIGS. 16 and 18.

Once the switch SW is open, it is possible, for example by means of the machine control logic, interrupting the power supply between the electrodes 12 and 13.

Consequently, the first portion of the shape memory wire 2 starts cooling and it retracts, causing the switch SW to close, while the rotor member 6 remains in the reached position, due to the engagement of the boss 144 formed on the lower lamina 141 of the movable electrode 14 with one of the cavities 622 underlying the projection 62 (FIG. 18).

In this way, at the end of the cooling phase, the first arm 424, no longer having the stress of the now-cooled shape memory wire 2, returns to the rest position due to the respective return spring 5'.

At the same time, the switch SW being no longer pushed by the end portion 4242 returns and remains in the closed configuration.

Figure 15:
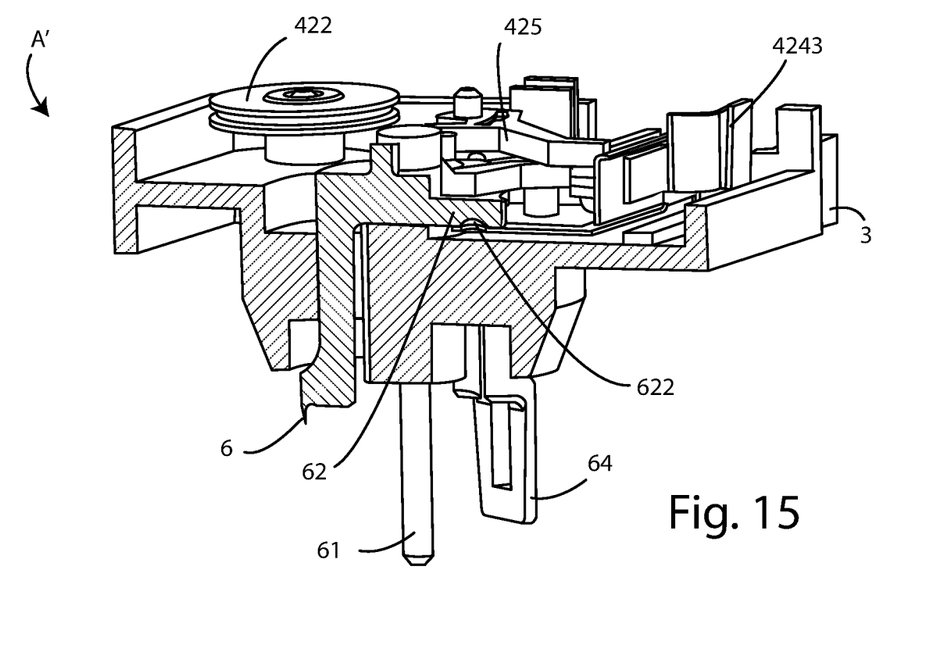
FIG. 15 shows a longitudinal section of the actuator according to FIG. 12.

One of the eccentric reliefs 63 is located close to the other arm 425 (see FIG. 15). In this way, if the first arm 424 was again activated, there would be no rotation of the rotor member 6, which would remain in the same position held by the protrusion 144.

Only the activation of the second arm 425, i.e. by feeding the electrodes 12 and 11, and therefore the second portion of the shape memory wire 2, will rotate, with a kinematics analogous to that described above, the rotor member 6. In this specific case, the current from the terminal board 15 will reach the movable electrode 14 through the blade 14a.

As it can be seen, also in this case, the actuator A' rotates the rotor member 6 in a bistable and entirely mechanical manner.

As it can be seen, finally, also in this case the shape memory wire 2 is clinched on the electrode 12 and the electrical terminals 4243 and 4253.

An advantage of the present invention is the fact that the described mechanism has a totally mechanical bistable operation.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. An electric actuator (A, A'), comprising
a rotor member (6) and
an actuating assembly (4) configured to interfere with said rotor member (6), causing it to rotate,
wherein said rotor member (6) comprises a pair of eccentric reliefs (63) arranged so as to interfere with said actuating assembly (4), and
wherein said actuating assembly (4) comprises a shape memory wire (2), and it is configured to cause the rotation of said rotor member (6) when electric current flows through at least a portion of said shape memory wire (2),
wherein said electric actuator (A') further comprises a movable electrode (14), comprising a protrusion (144), and
wherein said rotor member (6) comprises a pair of cavities (622), arranged so that when the rotor member (6) rotates, one of said cavities (622) removably engages with said protrusion (144) of said movable electrode (14), so as to keep in position said rotor member (6).

2. The electric actuator (A, A') according to claim 1, characterized in that said actuating assembly (4) is configured to alternately rotate said rotor member (6) in opposite directions.

3. The electric actuator (A, A') according to claim 1, characterized in that said rotor member (6) is engageable to a member to be moved, such as a driven shaft and the like, such that, when said rotor member (6) is rotated, the rotary motion is transferred to said member to be moved.

4. The electric actuator (A, A') according to claim 1, characterized
in that it comprises a switch (SW) and
in that said actuating assembly (4) is configured to interfere with said switch (SW).

5. The electric actuator (A, A') according to claim 4, characterized in that it comprises a first electrode (11), a second electrode (12), a third electrode (13) and said movable electrode (14), wherein said second electrode (12) and said movable electrode (14) form said switch (SW),
wherein one end of said shape memory wire (2) is coupled to said first electrode (11) and the other end to said third electrode (13), and
wherein said shape memory wire (2) is arranged so as to present an electrical coupling with said second electrode (12).

6. The electric actuator (A, A') according to claim 1, characterized in that said actuating assembly (4) comprises a first (411, 424) and a second (412, 425) actuating member capable of interfering with a respective eccentric element (63) of said rotor member (6) in a single direction.

7. The electric actuator (A') according to claim 6, characterized in that said actuating assembly (42) comprises a first (421) and a second (422) pulley, around which said shape memory wire (2) passes, and
in that said first and second actuating members comprise a first (424) and a second (425) arm, each rotatable and comprising a respective base portion (4241, 4251), shaped in such a way as to interfere with a respective eccentric element (63) of said rotor member (6), and an end portion (4242, 4252),
wherein each one of said first (424) and second (425) arms takes a rest position and an operative position, wherein the respective end portion (4242, 4252) interferes with said movable electrode (14), to open said switch (SW), and the respective base portion (4241, 4251) interferes with the respective eccentric element (63), causing the partial rotation of said rotor member (6), and
wherein, when the shape memory wire portion (2) arranged around one of said first (421) and second (422) pulley is power supplied so that a current flows through it overheating, said portion of shape memory wire (2) retracts and said first (421) or second (422) pulley rotates, so as to cause the rotation of the respective first (424) or second (425) arm, bringing it from said rest position to said operating position and causing the rotation of said rotor member (6) interfering with an eccentric element (63), the other eccentric element (63) of said rotor member (6) is thus arranged in a position such as to allow the rotation of said rotor member (6) only when the other arm is rotated (424 or 425).

8. The electric actuator (A') according to claim 7, characterized
in that each of said first (424) and second (425) arms also comprises a respective electric terminal (4243, 4253) and
in that it comprises two return springs (5'), each electrically coupled with a respective electrical clamp (4243, 4253), arranged to bring the respective first (424) and second (425) arms from said operating position to said rest position.

9. The electric actuator (A') according to claim 8, characterized
in that said shape memory wire (2) has the ends coupled to said electrical terminals (4243, 4253) and
in that one of said return springs (5') is interposed between said third electrode (13) and the electrical clamp (4243) of said first arm (424) and the other return spring (5') is interposed between said first electrode (11) and the electrical clamp (4253) of said second arm (425).

10. The electric actuator (A') according to claim 1, characterized
in that said movable electrode (14) comprises a lower lamina (141) and a support (143) coupled with said lower lamina (141) having said protrusion (144), and
in that said rotor member (6) comprises a projection (62), on which said cavities (622) are formed.

* * * * *